(12) United States Patent
Borøy et al.

(10) Patent No.: US 11,453,297 B2
(45) Date of Patent: Sep. 27, 2022

(54) SYSTEM FOR ENERGY REGENERATION AND DISTRIBUTION

(71) Applicant: National Oilwell Vareo Norway AS, Kristiansand (NO)

(72) Inventors: Yngvar Borøy, Kristiansand (NO); Oddbjørn Øye, Kristiansand (RO); Geir Odd Bergstøl, Kristiansand (NO); Stig Vidar Johansen Trydal, Søgne (NO)

(73) Assignee: National Oilwell Vareo Norway AS

( * ) Notice: Subject to any disclaimer, the term of this patent is extended or adjusted under 35 U.S.C. 154(b) by 1074 days.

(21) Appl. No.: 16/077,397

(22) PCT Filed: Feb. 17, 2017

(86) PCT No.: PCT/NO2017/050041
§ 371 (c)(1),
(2) Date: Aug. 10, 2018

(87) PCT Pub. No.: WO2017/142420
PCT Pub. Date: Aug. 24, 2017

(65) Prior Publication Data
US 2021/0197674 A1    Jul. 1, 2021

(30) Foreign Application Priority Data
Feb. 18, 2016  (EP) .................................... 16156321

(51) Int. Cl.
*B60L 50/15*  (2019.01)
*B63H 20/02*  (2006.01)
(Continued)

(52) U.S. Cl.
CPC .............. *B60L 50/15* (2019.02); *B63H 20/02* (2013.01); *B63B 2241/22* (2013.01); *B63H 2020/003* (2013.01); *B63J 2003/002* (2013.01)

(58) Field of Classification Search
CPC ... B60L 50/15; B63H 20/02; B63H 2020/003; B63B 2241/22; B63J 2003/002
See application file for complete search history.

(56) References Cited

U.S. PATENT DOCUMENTS 3,221,172 A    11/1965  Rolison
5,161,496 A *  11/1992  Matsushima .......... F02M 39/00
                                                    123/149 D (Continued)

FOREIGN PATENT DOCUMENTS

DE    102007054228    5/2009
EP       1261099 A2   11/2002
SU       1659293       6/1991

OTHER PUBLICATIONS

Extended European search report dated Sep. 12, 2019, for Application No. EP17753554.9.

(Continued)

*Primary Examiner* — Yazan A Soofi
*Assistant Examiner* — Naeem Taslim Alam
(74) *Attorney, Agent, or Firm* — Conley Rose, P.C.

(57) ABSTRACT

Disclosed is a system and method for regenerating and distributing energy, such as employed on a vessel or floating offshore installation, the system including a first power distribution system, a second power distribution system electrically isolated from the first power distribution system, and a flywheel mechanically connected to both the first and second power distribution systems. Each of the first and second power distribution systems may include a motor/generator mechanically connected to the flywheel and a drive module electrically connected to its respective motor/generator. The flywheel drive modules may be connected to a common flywheel control module that includes a control algorithm for operating the system.

13 Claims, 6 Drawing Sheets

(51) Int. Cl.
  *B63H 20/00* (2006.01)
  *B63J 3/00* (2006.01)

(56) References Cited

U.S. PATENT DOCUMENTS

| | | | |
|---|---|---|---|
| 5,712,456 A | 1/1998 | Bittar | |
| 6,175,163 B1* | 1/2001 | Rinaldi | B63H 23/24 290/1 A |
| 6,645,021 B1* | 11/2003 | Kawai | F02B 61/045 440/76 |
| 7,078,880 B2* | 7/2006 | Potter | H02J 3/30 322/4 |
| 7,395,889 B2* | 7/2008 | Sugiyama | B60W 10/105 180/243 |
| 10,024,297 B2* | 7/2018 | Gerami | F03D 5/06 |
| 2004/0102109 A1* | 5/2004 | Cratty | B63H 21/17 440/113 |
| 2004/0180585 A1* | 9/2004 | Kinoshita | B63J 2/06 440/1 |
| 2006/0121803 A1* | 6/2006 | Morvillo | G05G 5/005 440/41 |
| 2009/0322080 A1* | 12/2009 | Ruiz Minguela | F03B 13/20 290/53 |
| 2010/0314168 A1* | 12/2010 | Williams | B63B 35/4413 318/150 |
| 2012/0032444 A1* | 2/2012 | Burton | F03B 17/061 290/53 |
| 2013/0123989 A1* | 5/2013 | Krolak | H02P 21/30 713/300 |
| 2014/0197768 A1* | 7/2014 | Haugen | H02P 27/04 318/442 |
| 2014/0265343 A1* | 9/2014 | Bonney | B63J 3/04 290/54 |
| 2014/0343780 A1* | 11/2014 | Suzuki | B60W 30/18127 701/22 |
| 2015/0176561 A1* | 6/2015 | Li | F03B 13/186 290/53 |
| 2015/0229162 A1* | 8/2015 | Gottfried | H02J 9/066 307/65 |
| 2016/0118859 A1* | 4/2016 | Schäfer | H02J 15/00 307/84 |
| 2017/0005606 A1* | 1/2017 | Kuroki | H02M 1/00 |

OTHER PUBLICATIONS

English translation of abstract to DE 102007054228 (1 page).
Publication with International Search Report for PCT/NO2017/050041 dated Aug. 24, 2017 (21 pages).
Written Opinion for PCT/NO 2017/050041 dated Jul. 4, 2017 (6 pages).

* cited by examiner

SYSTEM FOR ENERGY REGENERATION AND DISTRIBUTION

CROSS REFERENCE TO RELATED APPLICATIONS

This application is a 35 U.S.C. § 371 national stage application of PCT/NO2017/050041 filed Feb. 17, 2017 and entitled "System for Energy Regeneration and Distribution", which claim priority to and European Patent Application No. 16156321.8 filed Feb. 18, 2016, each of which are incorporated herein by reference in their entirety for all purposes.

STATEMENT REGARDING FEDERALLY SPONSORED RESEARCH OR DEVELOPMENT

Not applicable

BACKGROUND

The present invention relates to a system for regenerating and distributing energy on a vessel. More specifically the invention relates to a system comprising two electrically isolated power distribution systems as well as a flywheel adapted to provide and receive energy to and from the system. The invention also relates to a vessel or a floating offshore structure comprising such a system as well as a method for regenerating and distributing energy on a vessel.

According to requirements and standards for dynamically positioned vessels, such as the so-called DP3 class, two fully redundant, electrically isolated energy distribution systems may be required, implying that if one of a starboard or port energy distribution system fails, then the other one of the energy distribution systems should be adapted to handle the full power consumption of the vessel. This implies that in normal use, the two energy distribution systems need to be over-dimensioned in order to be able to handle a sudden full or partial outage of power from one of the two sides.

SUMMARY OF THE DISCLOSURE

The present disclosure aims to remedy or to reduce at least one of the drawbacks of the prior art, or at least provide a useful alternative to prior art.

This is achieved through features, which are specified in the description below and in the claims that follow.

In a first aspect, this disclosure relates to a system for regenerating and distributing energy on a vessel, the system comprising:
 a first power distribution system; and
 a second power distribution system electrically isolated from said first power distribution system, wherein said system further comprises a flywheel mechanically connected to both said first and second power distribution systems.

Such a system will thus we adapted to transfer energy mechanically, via the flywheel, between the two energy distribution systems, typically being a port and a starboard energy distribution system of a vessel, respectively.

This disclosure is also related to a vessel or a floating offshore installation comprising a system according to the first aspect of the disclosure.

In a second aspect, this disclosure relates to a method for regenerating and distributing energy by means of a system according to the first aspect of the disclosure, wherein the method includes the step of transferring power to and from the flywheel to and from either of the two power distribution systems.

BRIEF DESCRIPTION OF THE DRAWINGS

In the following are described examples of preferred embodiments illustrated in the accompanying drawings, wherein.

DETAILED DESCRIPTION OF THE DISCLOSED EXEMPLARY EMBODIMENTS

Figure 1:
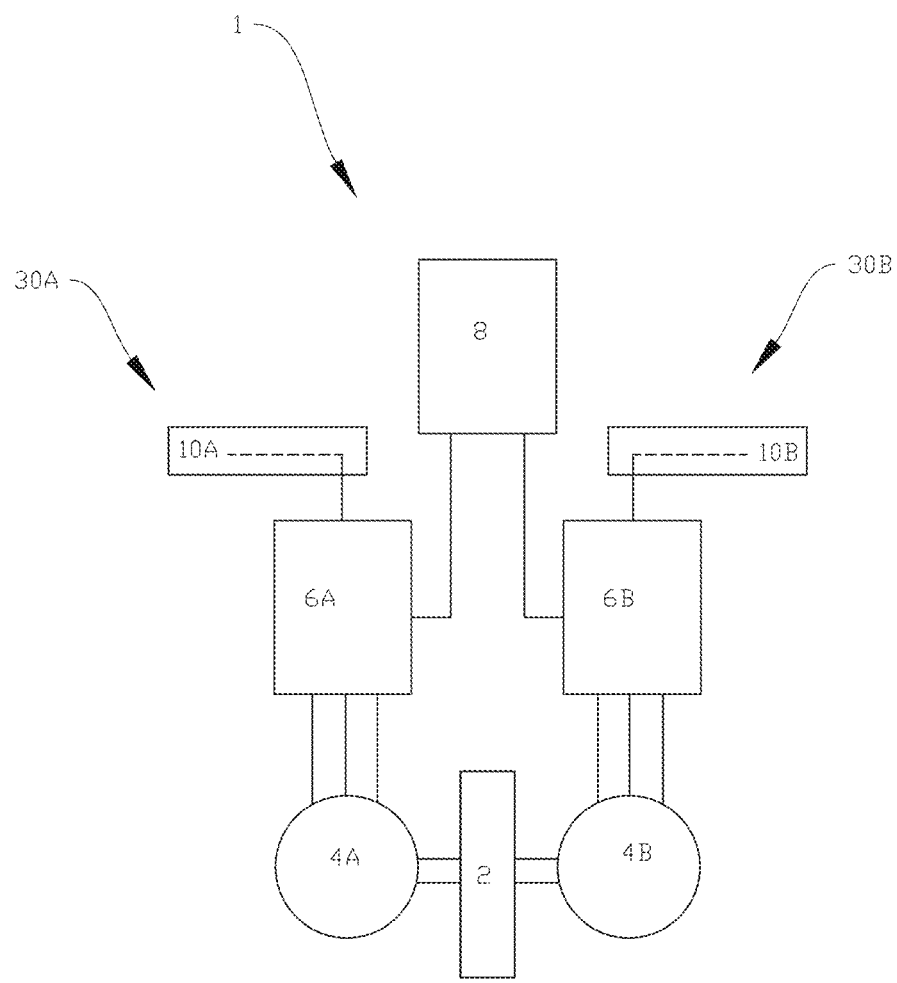
FIG. 1 shows a simple, schematic representation of one exemplary embodiment of a system according the present disclosure.

In the following discussion, the reference numeral 1 will denote a system according to the present disclosure, whereas the reference numerals 30A and 30B will represent the two, electrically isolated first and second power distributions systems, respectively. Identical reference numerals will indicate identical or similar features in the figures. The figures are drawn simplified and schematically, and the various features therein are not necessarily drawn to scale.

In the following discussion, a winch (SLW) will be used as an example of a power-consuming and -generating feature in a system according to the present disclosure, wherein the first power distribution system is connected to the motors/generators on one side of the winch and the second power distribution system is connected to motors/generators on the other side of the winch to provide a required redundancy. The flywheel(s) will be applied as a load during retardation and as energy source during acceleration of the winch. The motors will typically be AC asynchronous motors.

The system according to the present disclosure may integrate renewable power generation into offshore generator-fed grid supplies in order to improve the overall grid redundancy for critical or essential equipment. Such micro grids have until now been operating solely on fossil fuel and will in addition benefit from improved efficiency. The effect of the described integrated solution is an ability to deliver a safe, reliable, stable and efficient power supply to controlled electrical consumers, such as a winch, on offshore vessels and rigs. A flywheel system ensures significantly improved safety and efficiency, especially through compensation of heave movements by local accumulation of energy. The accumulated energy will be available as backup power supply, at all times and for redundancy, thus potentially significantly reducing the need for dimensioning of the two separate power distribution systems.

In one exemplary embodiment, the system may utilize a flywheel in addition to a conventional supply of power in order to energize an electrical winch system. The flywheel will be applied as a load to the winch during retardation, whereby energy can be stored and fed back to the winch during acceleration. Such a use of a flywheel will reduce the peak- and average power requirements from generators, reduce the need for cooling of breaking resistors, and provide energy for a controlled shut-down procedure at power failures.

The concept relies on two motors in a tandem arrangement connected to a common flywheel. The term "motor" applies in this description to an electrical component equally capable of operating as a motor and a generator. This specific tandem arrangement provides the means for a controlled and intrinsically safe bidirectional transferal of power between separated, galvanically isolated branches, herein named first and second power distribution system, of the power system on the offshore floating installation or vessel.

The flywheel(s) may be designed to at least have an inertia in sum equal to a capacity of supplying the winch at full rated power to perform a lifting action of a height of 2 times the peak to peak of maximum rated heave. The flywheel system may be able to continuously sink and source power up to its nominal power rating and shorter peaks up to its maximum rating.

The flywheel(s) will normally be 50% charged in normal idle status, fully prepared and capable of both sourcing and sinking all power—in worst case—required to perform one full rated active heave-compensated (AHC) period without external power supply or braking resistor dissipation. The state of charge reference setting (SOC) will allow this value to be adjusted from 0 to 100%, and applies equally to the flywheel motors on both sides of the winch, or generally to the two motors connected in tandem. The SOC actual value will naturally vary through a heave period, as a direct result of compensating by sourcing and sinking energy at the appropriate phases, but the mean value over a couple of heave periods will be kept at a constant level by a closed control loop.

The state of charge reference setting (SOC) may be set as a fixed parameter locally, or adjusted dynamically by an external power management system or the consumer itself (winch) during operation.

FIG. 1 shows schematically and simplified a first exemplary embodiment of a system 1 according to the present disclosure. The port side of the system is denoted A while the starboard side of the system 1 is denoted B. A flywheel 2 mechanically connects a flywheel motor 4A on the port side A to a flywheel motor 4B on the starboard side B. Each flywheel motor 4A, 4B is driven by means of a respective flywheel drive module 6A and 6B, where both drive modules 6A, 6B further are connected to a flywheel control unit 8 (PLC), the control unit 8 including control logic, network communication and signal interface. Each flywheel drive module 6A, 6B is further connected to a respective DC-link 10A and 10B. The power components on the port side A represent the first power distribution system 30A, while the power components on the starboard side B represent the second power distribution system 30B. The two power distribution systems are mechanically connected through the flywheel 2.

Figure 2:
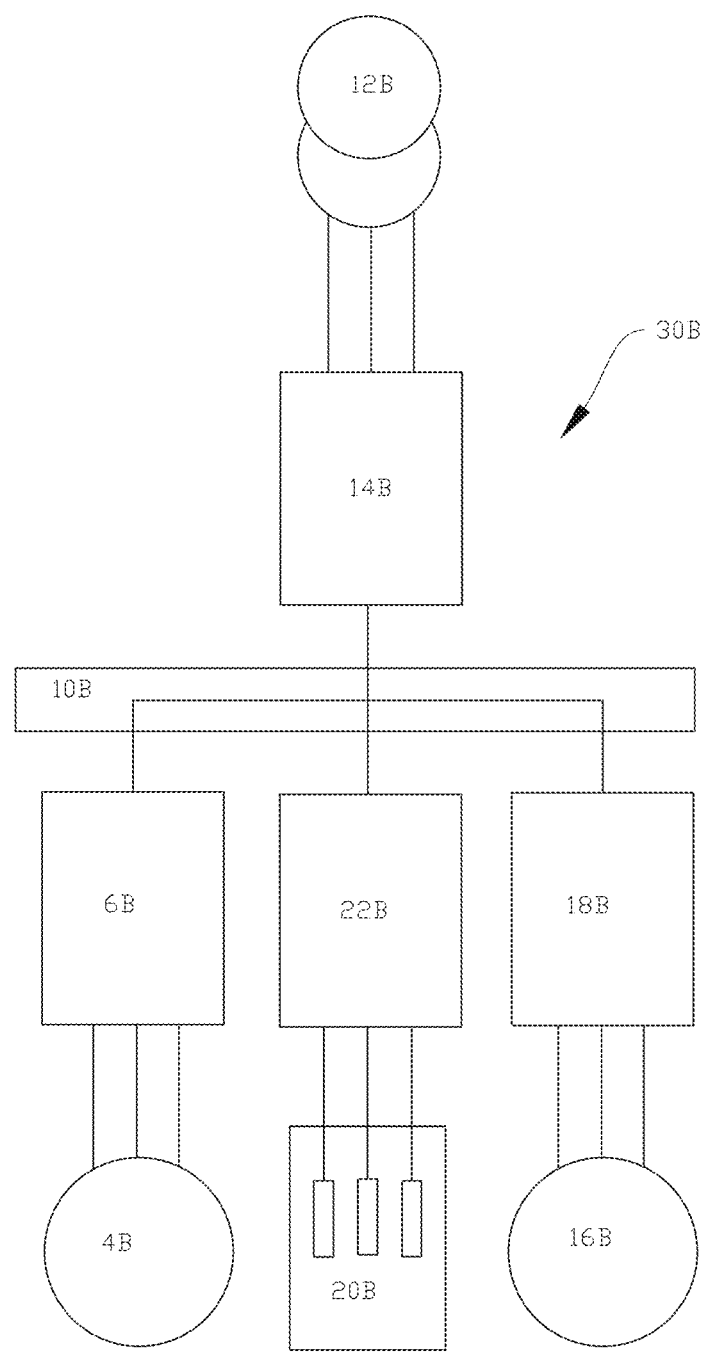
FIG. 2 shows a schematic representation of one of the power distribution systems connected to one side of a winch.

FIG. 2 shows, in somewhat more detail, the second power distribution system 30B, only, of a system 1 according to the first aspect of the disclosure. The mechanical connection to the flywheel 2 itself is not shown in the figure. The figure shows how the various power components of the system 1 may connect through the DC-link 10B. The DC-link 10B represents the physical power interface that makes it possible to exchange energy between the two subsystems, from winch to flywheel 2 and back, where neither the winch nor the flywheel is shown in the figure. A voltage transformer 12B supplies power to a diode bridge rectifier 14B, the diode bridge rectifier converting AC to DC. The diode bridge rectifier 14B connects to the power components of the flywheel 2 and winch as will explained in the following. The DC-link 10B connects to the flywheel motor 4B through the flywheel drive module 6B, as already indicated in FIG. 1. Through the DC-link 10B, the flywheel drive module 6B, and thereby also flywheel motor 4B, connects to a winch motor 16B through a winch motor drive module 18B, the winch motor drive module 18B inverting DC to AC. A braking chopper 22B is connected to the DC-link 10B and to braking resistor 20B for the winch, the braking chopper 22B and braking resistor 20B being adapted to sink energy from the winch if needed.

Figure 3:
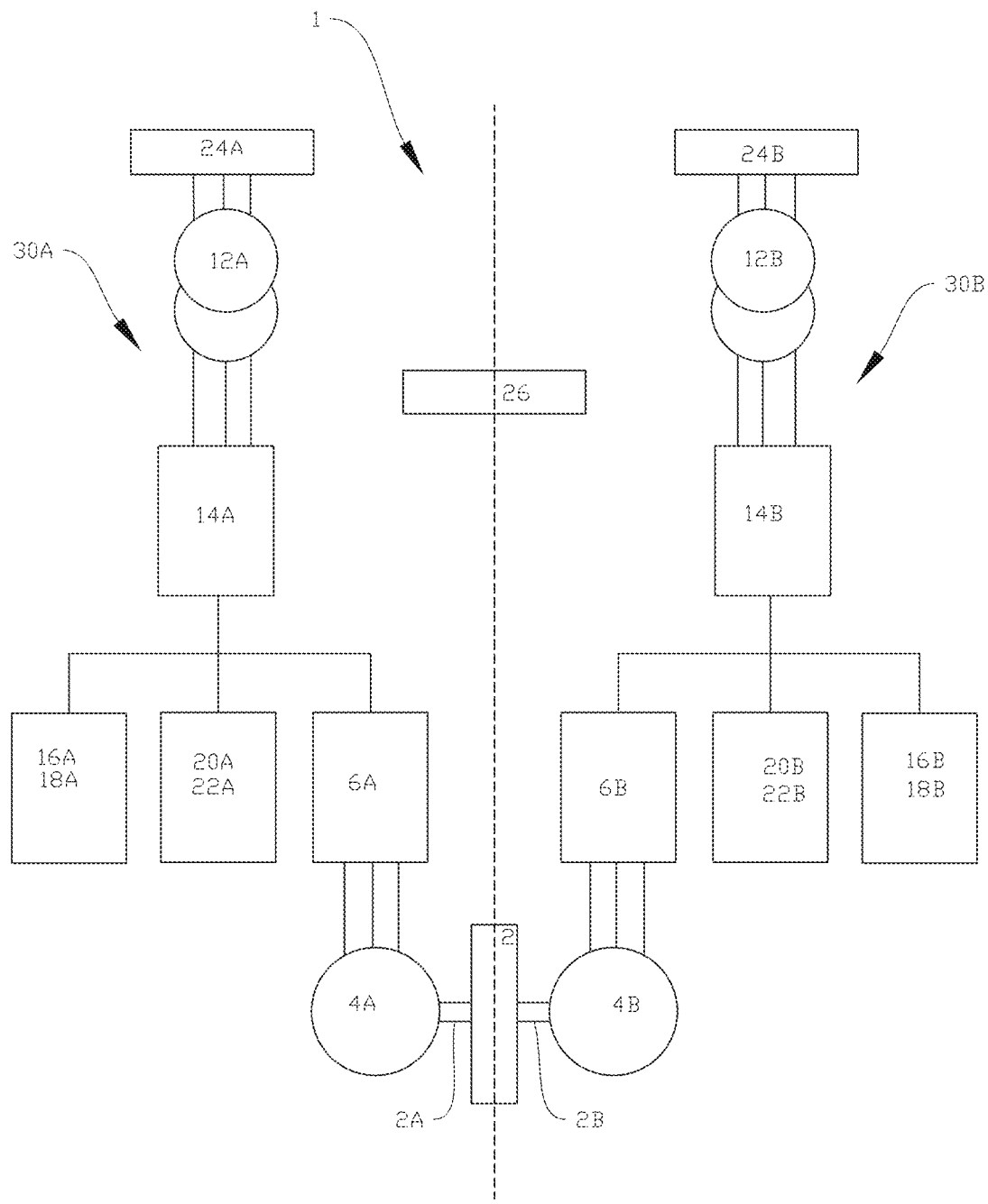
FIG. 3 shows a schematic representation of a split/electrically/galvanically isolated system according to the disclosure.

FIG. 3 is a schematic, simplified representation of a system 1, the system 1 including first and second power distributions systems 30A, 30B on the port A and starboard B sides, respectively, of a (not shown) vessel. The port side A of the system 1 is powered by means of a port side AC power supply 24A, while the starboard side is powered by a starboard side AC power supply 24B. The port and starboard sides are mechanically connected through the flywheel 2, where one flywheel shaft 2A connects the flywheel 2 to the port side flywheel motor 4A, and one flywheel shaft 2B connects the flywheel to the starboard side flywheel motor 4B. The reference numeral 26 represents a DP3 power system split, indicating that the power distribution systems are electrically/galvanically split/isolated from each other. A complete winch system will typically be supplied from a main switchboard by two main transformers 12A, 12B on port A and starboard B sides. This arrangement with Split Power System is according to relevant rules for Equipment on Dynamically Positioned Vessels Class 2 or 3 (E.g. DNV DYNPOS-AUTRO & DPS3). For simplicity, the DC-links 10A, B are not indicated in FIG. 3.

An offshore drilling- or subsea winch may comprise several electrical motors working in parallel in order to fulfill requirements for general redundancy and comply with rules for dynamically positioned vessels. In most cases the two sides of the split need to be electrically separated as long as the transformers on both sides are operational.

Reference numerals 16A and 18A of FIG. 3. represent all motors supplied from port side A. Similarly reference numerals 16B and 18B represent all motors supplied from starboard side B. Motors on both sides typically contribute with 50% of the total load handling capacity. In the event of generator black-out or supply failure on one side of the split, the intelligent tie-breaker action of the flywheel system will be able to prevent any load handling reduction to occur at any time. Conventional bus tie breakers according to the prior art will most often require up to several minutes to implement the physical interconnection between the two DC-links.

For very large winch configurations it may be preferable if several flywheel skids are employed in a combined action, supporting sets of separate DC-links. A simplified example is shown in FIG. 4.

The port main transformer 12A will supply all motors on the port side A of the vessel, while the starboard main transformer 12B will supply all motors on starboard side B of the vessel, in order to fully utilize the redundant supply from a split generator system. Each flywheel will in this manner be able to assist both starboard and port side of the total power system.

The control algorithm may preferably be prepared for various power supply arrangements, one and two main transformers as a minimum 6/12/18 or 24-pulse type. An example of one of the alternative realizations of a 12-pulse system is illustrated in FIG. 4.

Figure 4:
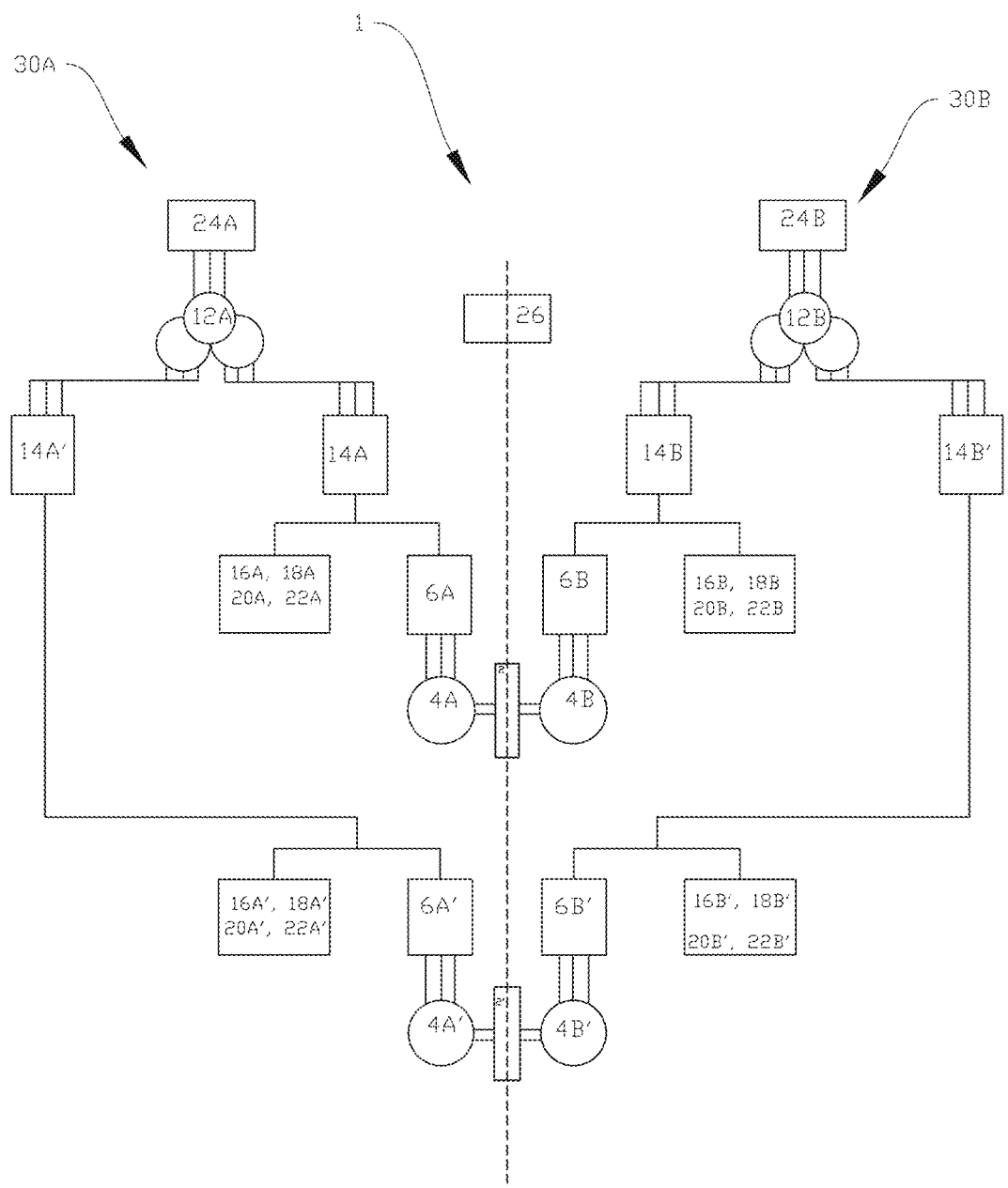
FIG. 4 shows a system according to the present disclosure including a plurality of flywheels.

FIG. 4 is a schematic, simplified representation of a system 1 according to the present disclosure, wherein the system 1 includes a plurality, here exemplified by two, flywheels 2, 2' for regenerating and distributing energy on the (not shown) vessel. Power from the port side AC power supply 24A is supplied to two port side rectifiers 14A, 14A', each of the rectifiers being connected to a respective flywheel 2, 2' via not shown DC-links, and similarly the starboard side AC power supply 24B is supplied to two starboard side rectifiers 14B, 14B', each of the rectifiers being connected to the same, respective flywheels 2, 2'.

Active power consumption may be monitored at both main transformer inputs, as well as by a measuring point prior to the rectifier input of each individual DC-link. Active power on motor shaft, in and out of one flywheel, may be monitored at each of the two flywheel motors, in the following only referenced to as FLW motor A and FLW motor B.

The control algorithm for one flywheel may be adapted to handle all relevant operational energy control performance, both as a standalone unit and also in conjunction with additional flywheel systems, when required due to the total SLW size.

Large systems with more than one flywheel may adopt an overall control algorithm for aligning the various energy contributions of each flywheel skid in order to achieve optimal control of the overall loading of the two main transformers on port and starboard sides.

The flywheel system may be equipped with its own measuring sensors at strategically selected locations in order to achieve sufficient autonomy, even in error situations. The control algorithm may be designed with dedicated focus on the information exchange with the winch. The interface is kept to a necessary minimum and optimized for precision and efficiency. With this kind of design it will be easy to adapt the flywheel to a variety of variable frequency drive- (VFD) controlled winches and similar drilling equipment.

Monitoring of DC-link voltage may allow for controlling the energy flow in the system in an optimal way. The following relationships will form the basis for the interpretation of the current value of the DC-link voltage, and there are two main possible situations or modi operandi in this respect:
 a) Healthy power distribution
 b) Black-out/error mode a) Healthy Power Distribution When the winch is in AHC operation, with full support from the starboard and port generator systems, as well as the flywheel system, the DC-link voltage will typically have a value between Idle loading and Full SWBD loading. If guidelines from the vendor of the VFD system are followed during VFD dimensioning, actual values will typically be between 1.35 and 1.41 times the AC input voltage to the rectifiers.

For simplicity, the relationship in Table 1 is shown for SLW without flywheel.

TABLE 1

DC-link voltages at various conditions

| Winch action | DC-link voltage will read | Power supplied from SWBD | Braking chopper action |
| --- | --- | --- | --- |
| Winch at standstill | Idle loading value = approx 1.41 * AC in | Idle losses only | Off |
| Winch hoisting full load | Full SWBD loading value = approx 1.35* AC in | Full rated load | Off |
| Winch lowering full load | chopper activation level = parameter value, typically 1070 V DC | No | On |

The braking chopper will never need to activate when the SLW w/flywheel is running in AHC mode, as long as the heave movements are within the rated limits given by the dimensioning of the energy storage. The SLW AHC consumption, as seen from the rectifiers, will be smoothed to a more or less stable value and equal to the average SLW consumption. The DC-link will reflect the same situation by a relatively steady voltage within the two above mentioned typical limits. The control unit/PLC will be able to accurately modify overall winch consumption by means of adjusting the value and sign of the shaft power of the electric flywheel motor. This is achieved by taking the rpm of the flywheel into account and sending accurately calculated torque commands to the flywheel motor module.

Figure 5:
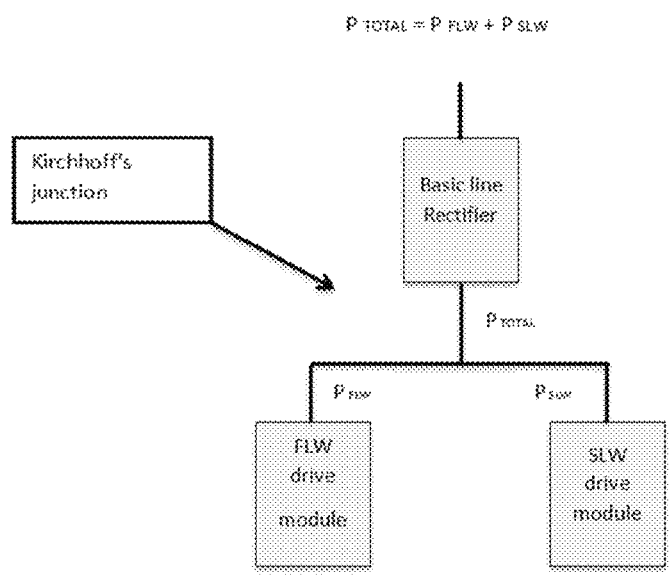
FIG. 5 shows a power distribution between the flywheel drive module and winch drive module.

The overall SLW consumption, P TOTAL, may be measured directly by a sensor, since it also is the value that actually will be subject to this system's control. The following simple formula is derived from Kirchhoff's junction rule that states: "The current entering any junction is equal to the current leaving that junction". This also applies to power calculation, as long as the involved voltage is equal for all branches, like here on the common DC-link as indicated in FIG. 5.

b) Black-Out/Error Mode/Short Time UPS

The main or single goal for the control algorithm in this mode is to prevent the DC-link power components of the SLW from tripping.

The DC-link will immediately be affected by generator black-out. The fault response will be a rapid falling DC-link voltage. The rectifiers will no longer transfer energy to the DC-link components, and the rate of voltage drop down towards the tripping limit will mainly be determined by two factors: the actual sum of power consumption level at the time of drop-out and the size of the link's capacitor bank.

Generator black-out, any other power distribution fault and rectifier component fault will all give identical fault responses. This scenario will therefore in the following be identified as "black-out".

Dedicated software code for this black-out/error mode may be placed locally within the drive module, e.g. in a "free" programming block, instead of in the PLC. This is due to the system requirements related to obtaining minimum control delay.

Avoiding conflicts between the two separate control algorithms for each mode is achieved by letting the DC-link voltage determine which of the two that will be in effect. The DC voltage is measured locally within the FLW drive module, and the control code within this module will take precedence when the voltage levels dictates so.

Figure 6:
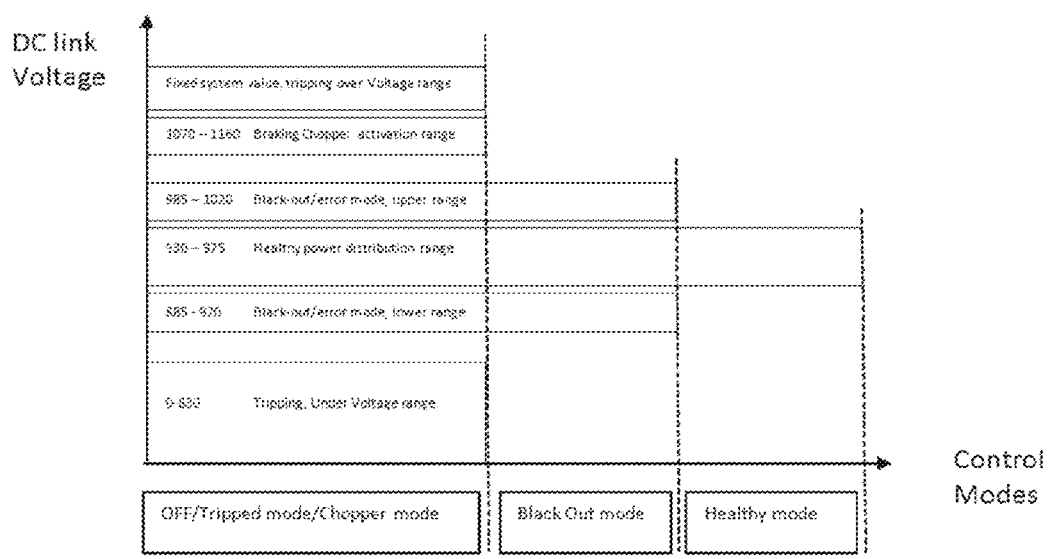
FIG. 6 shows a schematic representation of different operation/control mode vs. DC-link voltage.

The main control concepts for Black Out mode of the FLW motor module will have similarities to the ones used for braking choppers. The logic control of the FLW motor module will need to monitor the DC-link voltage and control the magnitude of the output power flow in relation to this internally measured value. As indicated in FIG. 6, with a DC-link voltage in the range 985-1020 the motor module will charge power from DC-link to flywheel, while in the area 885-920, the motor module will discharge power from flywheel to DC-link. This will stabilize the DC-link voltage and prevent the system from tripping due to reaching the Under Voltage Limit.

Some of the aims of the present disclosure and its various embodiments are summarized below.

Short time uninterrupted power supply (UPS) for tripping prevention during drop out of external supply: External supply can drop out without any prior warning, pre-warning or prediction. The system may react extremely fast (typ. 5-10 ms) immediately after the exact time of power-outcome in order to prevent a common DC-link from falling below critical tripping level. Dedicated software code for this associated function may be placed locally within a flywheel drive module, instead of in the control unit/PLC. In the event of major mains failure (black ship) the flywheel will slowly spin down until standstill and during this time provide necessary power to keep the winch alive for a controlled shutdown process.

Intelligent tie-breaker: The two motors and flywheel on a common shaft will be able to transfer power mechanically from one side to the other. This could be like shifting from one generator set to another, or from one micro grid to another. When the external supply for one of the side drops, the short time UPS for that side will be activated, and compensate for the power loss by discharging the flywheel into the still operating consumer or load. The other motor will then immediately start acting as to maintain the energy level of the common flywheel back towards the default or selected state by feeding it with the required amount of power. This feature will increase the energy capacity of the short time UPS feature up to virtually unlimited. Transferal of power between galvanically isolated branches of the power distribution system may be carried out without any interruption of the power consuming operation of load.

Reducing high power peaks supplied from the generators: Any peak to reduce will have its only possible origin from sudden changes in winch consumption, and these changes will be relatively slow (several hundreds of ms and up). The Flywheel system will detect the consumer load fluctuation, respond with a complementary dynamic power injection or absorption for the exact required amount of time, and this way provide the grid stabilizing.

Reducing average power consumption: The flywheel system will capture all braking power from a load or consumer of an integrated system as opposed to the conventional dissipation into the braking resistor. Solely to prevent the brake chopper from activating will have a major effect on the overall consumption.

Reducing cooling requirements: Solely to prevent the brake chopper from activating will fulfill the promised reduction.

It should be noted that the above-mentioned exemplary embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A system for regenerating and distributing energy on a vessel, the system comprising:
    a first power distribution system;
    a second power distribution system electrically isolated from said first power distribution system; and
    a flywheel mechanically connected to both said first and second power distribution systems.

2. The system according to claim 1, wherein the system further comprises:
    a first motor/generator mechanically connected to the flywheel in said first power distribution system;
    a first flywheel drive module electrically connected to said first motor/generator;
    a second motor/generator mechanically connected to the flywheel in said second power distribution system; and
    a second flywheel drive module electrically connected to said second motor/generator.

3. The system according to claim 2, wherein said first and second flywheel drive modules are connected to a common flywheel control module, the common flywheel control module configured to execute a first control algorithm for operating the system.

4. The system according to claim 3, wherein the system further comprises sensors for monitoring at least one of a first DC-link voltage of said first power distribution system and a second DC-link voltage of said second power distribution system.

5. The system according to claim 4, wherein said sensors for monitoring at least one of the first DC-link voltage and the second DC-link voltage are located in said first and second flywheel drive modules.

6. The system according to claim 5, wherein said first flywheel drive module and said second flywheel drive module are configured to execute a second control algorithm for controlling said system, and wherein said first flywheel drive module and said second flywheel drive module are configured to let said second control algorithm take precedence over said first control algorithm if at least one of the measured first DC-link voltage and the second DC-link voltage falls below a predetermined value.

7. The system according to claim 1, wherein the system further comprises a winch, wherein said first power distribution system is connected to one side of the winch and wherein said second power distribution system is connected to another side of the winch.

8. The system according to claim 1, wherein the system is onboard a vessel.

9. The system according to claim 1, wherein the system is onboard a floating offshore installation.

10. A method for distributing energy on a vessel, the method comprising the steps of:
    (a) providing a first power distribution system;
    (b) providing a second power distribution system electrically isolated from the first power distribution system;
    (c) mechanically connecting a flywheel to both the first power distribution system and the second power distribution system; and
    (d) transferring power between the flywheel and at least one of the first power distribution system and the second power distribution system.

11. The system of claim 1, wherein:

the first power distribution system comprises a first flywheel motor mechanically connected to the flywheel, and a first DC-link electrically connected to the first flywheel motor;

the second power distribution system comprises a second flywheel motor mechanically connected to the flywheel, and a second DC-link electrically connected to the second flywheel motor and electrically isolated from the first DC-link;

the system further comprises a winch, a first winch motor coupled to the winch and electrically connected to the first DC-link of the first power distribution system, and a second winch motor coupled to the winch and electrically connected to the second DC-link of the second power distribution system, wherein the second winch motor is electrically isolated from both the first DC-link and the first winch motor.

12. The system of claim 11, wherein:

the first power distribution system comprises a first AC power supply electrically connected to the first DC-link; and the second power distribution system comprises a second AC power supply electrically connected to the second DC-link and electrically isolated from the first AC power supply.

13. The system of claim 12, wherein:

the first power distribution system comprises a first AC-to-DC rectifier electrically connected between the first AC power supply and the first DC-link; and the second power distribution system comprises a second AC-to-DC rectifier electrically connected between the second AC power supply and the second DC-link.

* * * * *